US012689883B2

(12) United States Patent
Chikatmarla et al.

(10) Patent No.: US 12,689,883 B2
(45) Date of Patent: Jul. 21, 2026

(54) REMOVING REQUESTER NF TYPE AMBIGUITY IN INTER-PLMN DISCOVERIES

(71) Applicants: Boost SubscriberCo L.L.C., Englewood, CO (US); DISH Network Technologies India Private Limited, Bangalore (IN)

(72) Inventors: Jaya Chandra Chikatmarla, Highlands Ranch, CO (US); Kumar Anshuman, Bengaluru (IN); Sruthi Nair, Aurora, CO (US); Dawood Shahdad, Aurora, CO (US); Mythri Amulya Sabhapati, Highlands Ranch, CO (US); Niraj Kanti Samal, Bangalore (IN)

(73) Assignees: Boost SubscriberCo L.L.C, Englewood, CO (US); DISH Network Technologies India Private Limited (IN)

( * ) Notice: Subject to any disclaimer, the term of this patent is extended or adjusted under 35 U.S.C. 154(b) by 355 days.

(21) Appl. No.: 18/243,293

(22) Filed: Sep. 7, 2023

(65) Prior Publication Data

US 2025/0088837 A1     Mar. 13, 2025

(51) Int. Cl.
*H04W 84/04* (2009.01)
*H04W 8/12* (2009.01)

(52) U.S. Cl.
CPC ............ *H04W 8/12* (2013.01); *H04W 84/042* (2013.01)

(58) Field of Classification Search
CPC ...................................................... H04W 8/12
See application file for complete search history.

(56) References Cited

U.S. PATENT DOCUMENTS

2021/0185523 A1* 6/2021 Targali ............. H04W 12/0471
2024/0264600 A1* 8/2024 Oshima ................. B64U 70/70
2024/0373224 A1* 11/2024 Mohan ............... H04W 12/069

* cited by examiner

*Primary Examiner* — Michael T Vu
(74) *Attorney, Agent, or Firm* — Jeremiah J. Baunach; Frontier IP Law PLLC

(57) ABSTRACT

According to various embodiments, systems and methods disclosed herein can configure a profile of at least one NF of a 5G network to support a plurality of requester NF types, including the type of network repository function (NRF). The NF profile can be registered with the NRF of the 5G network. Such NF profile configurations and registrations enable the at least one NF to be discovered by discovery requests that use NRF or a consumer NF type as the requester NF type, thus increasing interoperability between the HPMN and roaming partners that use different requested NF types in their NF discovery requests.

17 Claims, 8 Drawing Sheets

```
{
  "nfInstanceId": "33ae29b8-fe6d-41ec-9216-8d673c526000",
  "nfType":   "UDM",        ←——403              ——404
  "nfStatus": "REGISTERED",
  "ipv4Addresses":    ["127.0.0.12"],
  "allowedNfTypes": ["NRF","AMF", "SMF", "AUSF"], ←
  "priority": 0,
  "capacity": 100,
  "load": 0,
  "nfServices":    [{
       "serviceInstanceId":    "33ae6342-fe6d-41ec-9216-8d673c526000",
       "serviceName": "nudm-ueau", ←
       "versions": [{                    ——405
           "apiVersionInUri": "v1",
           "apiFullVersion": "1.0.0"
         }],
       "scheme": "http",
       "nfServiceStatus": "REGISTERED",
       "ipEndPoints": [{
           "ipv4Address": "127.0.0.12",
           "port": 7777
         }],
       "allowedNfTypes": ["NRF","AMF"], ←
       "priority": 0,
       "capacity": 100,                  ——407
       "load": 0
  }, {
       "serviceInstanceId": "33ae6360-fe6d-41ec-9216-8d673c526000",
       "serviceName": "nudm-uecm", ←
       "versions": [{                    ——409
           "apiVersionInUri": "v1",
           "apiFullVersion": "1.0.0"
         }],
       "scheme": "http",
       "nfServiceStatus": "REGISTERED",
       "ipEndPoints": [{
           "ipv4Address": "127.0.0.12",
           "port": 7777
         }],
       "allowedNfTypes": ["AMF"], ←
       "priority": 0,
       "capacity": 100,                  ——411
       "load": 0
  }
  ...
}
```

501
Gather NF information (name, type, services, interface, etc.)

503
Create a registration payload that contains data in the NF profile (e.g., JSON/XML With NRF as an allowed NF type)

505
Send a registration request to the NRF

507
Validates the registration request

509
Store the NF profile in the NRF repository

511
Receives a registration response

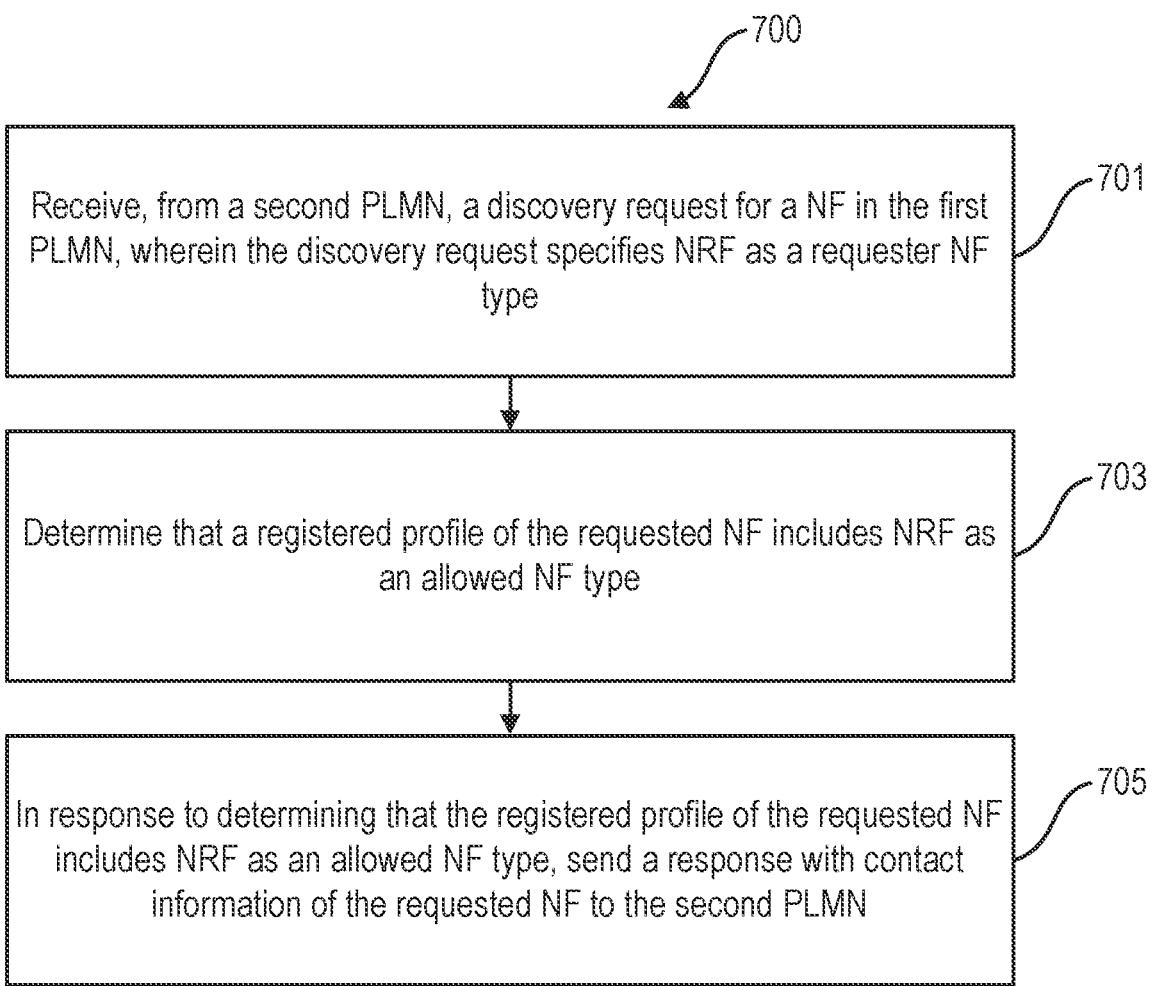

700

Receive, from a second PLMN, a discovery request for a NF in the first PLMN, wherein the discovery request specifies NRF as a requester NF type — 701

Determine that a registered profile of the requested NF includes NRF as an allowed NF type — 703

In response to determining that the registered profile of the requested NF includes NRF as an allowed NF type, send a response with contact information of the requested NF to the second PLMN — 705

FIG. 7

REMOVING REQUESTER NF TYPE AMBIGUITY IN INTER-PLMN DISCOVERIES

TECHNICAL FIELD

The present disclosure relates generally to cellular telecommunication networks and, more particularly, to inter-PLMN (Public Land Mobile Network) discovery in 5G networks.

BRIEF SUMMARY

Fifth-generation wireless (5G) roaming for voice is referred to as N9 home routing (N9HR) and is needed when subscribers (e.g., smart phones) roam onto a network other than their HPLMN (Home Public Land Mobile Network). In such a case, the VPLMN (Visited Public Land Mobile Network) can use multiple request parameters to send a discovery request for network functions (NF) of the HPLMN. The request parameters can include a target NF type and a requester NF type. However, the 3GPP specifications do not require a 5G network to use a particular requester NF type in a discovery request in N9HR roaming. Therefore, the discovery request from the VPLMN can be rejected by the HPLMN if the discovery request uses a requester NF type that does not match the requester NF type expected by the requested NF.

According to various embodiments, systems and methods disclosed herein can configure a profile of at least one NF of a 5G network to support a plurality of requester NF types, including the type of network repository function (NRF). The NF profile can be registered with the NRF of the 5G network. Such NF profile configurations and registrations enable the at least one NF to be discovered by discovery requests that use NRF or a consumer NF type as the requester NF type, thus increasing interoperability between the HPMN and roaming partners that use different requested NF types in their NF discovery requests.

In an embodiment, a system can comprise a memory that stores computer-executable instructions; and at least one processor that executes the computer-executable instructions to cause the HPLMN to perform operations for enabling N9HR roaming. The operations include receiving, from a VPLMN, a discovery request for an NF in the HPLMN, the discovery request specifying NRF as the requester NF type (i.e., the producer NF); determining that a registered profile of the requested NF includes at least NRF as an allowed NF type, which enables the requested NF to be discovered by discovery requests from a consumer NF that specify the allowed NF type as the requested NF type; and in response to such determination, sending an object including contact information of the requested NF to the VPLMN. Thus, the system would enable subscribers of the HMPL to roam to different 5G networks regardless of whether the 5G networks are configured to use NRF or an actual NF (i.e., a consumer NF type) as the requester NF type in their discovery requests to the HMPL.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 illustrates an example of a segment of a NF profile according to an embodiment of the disclosure.

FIG. 7 is a flow diagram illustrating an example process of enabling N9HR roaming in 5G networks according to an embodiment of the disclosure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
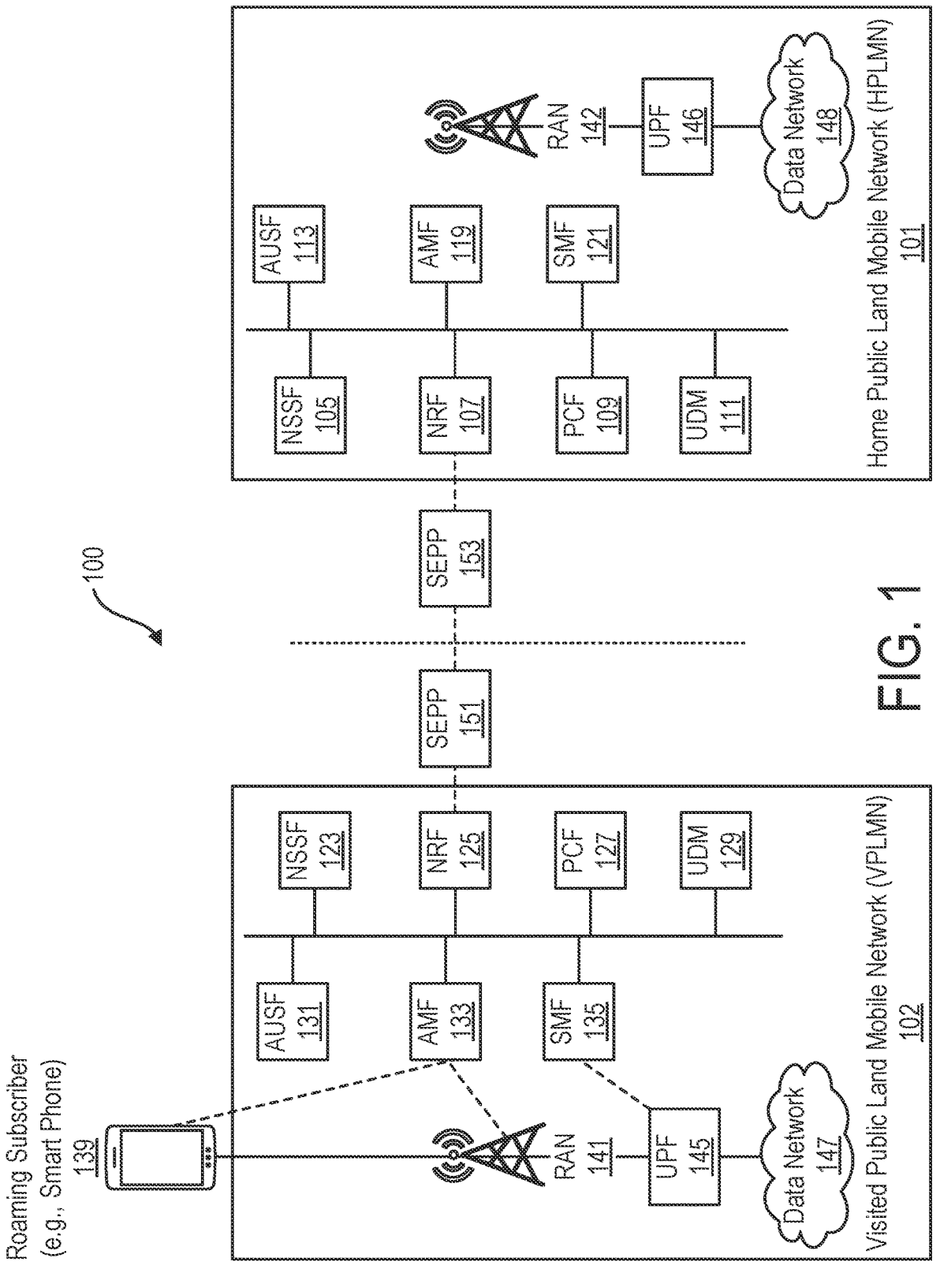
FIG. 1 is a block diagram illustrating an example roaming architecture 101 in which various embodiments of removing requester NF type ambiguity can be implemented according to an embodiment of the disclosure.

FIG. 1 is a block diagram illustrating an example roaming architecture 100 in which various embodiments of removing requester NF type ambiguity can be implemented according to an embodiment of the disclosure. This figure shows an HPLMN 101 and a VPLMN 102 operated by different 5G operators. a subscriber 139 (e.g., a terminal device such as a smart phone) of the VPLMN 102 has roamed to the VPLMN 102, and can establish a connection with a base station (e.g., a RAN 141) of the VPLMN 102 to access data and services in the VPLMN 102 as if the subscriber 139 was directly connected to the HMPLN 101. The two networks 101 and 102 may have roaming agreements that define terms and conditions under which subscribers to roaming one network can access services of another network. For example, the terms and conditions can cover pricing, data caps, Quality of Service (QOS)

Both networks 101 and 102 can be 5G compliant networks and thus each network can include a user plane and a control plane that are designed to efficiently transport user-generated data, such as internet traffic, multimedia content, and application data, between a subscriber and a data network. The key components of the user plane include a subscriber (e.g., a smart phone), a radio access network (RAN), a user plane function (UPF), and a data network. The RAN can include 5G base stations for connecting subscribers to a 5G network and handles data packets transmission over the air interface between subscriber and the base stations. The UPF can interconnect with the data network, and can perform several functions, such as packet routing and forwarding, packet inspections, and QoS (Quality of Service) handling. The data network can be located out of the core network of a 5G network. Examples of the data network can include Internet and IP multimedia subsystem (IMS). In this figure, the user plane of the VPLMN 102 includes the subscriber 139, the RAN 141, a UPF 145, and a data network 147; and the user plane of the HPLMN 101 includes a subscriber (not shown), a RAN 142, a UPF 146, and a data network 148.

In one embodiment, the control plane of each 5G network includes a network slice selection function (NSSF) for selecting an appropriate network slice based on user and service requirements, and a network repository function (NRF) for centrally storing profiles of NFs in the 5G network. The NRF can provide a standard API that enables the NFs to register their profiles with the NRF, through which the registered NFs may discover each other and consume each other's services. The control plane further includes a policy control function (PCF) used to develop and implement policies in the 5G network, and a unified data management (UDM) functioning as a central repository for storing user-related data, such as subscriber profiles, authentication credentials, and service subscriptions. The control plane further includes an authentication server function (AUSF) that handles user authentication and key management, validates the identity of subscribers, and provides security credentials for establishing secure communication. The control plane can further include an access and mobility management function (AMF) for performing mobility-related functions (e.g., device registration and mobility management), tracking locations of subscribers, and managing handovers between them. Further, the control plane includes a session management function (SMF) for performing session-related functions, such session establishment, session modification, and session termination for subscribers.

The above components in the control plane as well as the UPF in the use plane for each 5G network is a network function (NF), which can be software-based component that perform specific tasks and operations. These NFs work in conjunction to deliver mobile services and applications to subscribers efficiently and securely. In one embodiment, the NFs in the user plane and the control plane of each 5G network constitute a 5G core of the 5G network.

As shown in the figure, the 5G core of the HPLMN 101 includes NFs 105-121 and 146, and the 5G core of the VPLMN 102 includes NFs 123-135 and 145.

Before the subscriber 139 can send a service request to the VPLMN 102 through the RAN 141 of the VPLMN 102, the VPLMN 102 needs to determine which NFs in the VPLMN 102 can provide the requested service. For that purpose, the VPLMN 102 can send a discovery request to the NRF 125, which can determine whether the requested service is available locally or available remotely in the HPLMN 101.

If the requested service is locally available, the subscriber 139 can receive the requested service from the VPLMN 102. Otherwise, the NRF 125 can send a discovery request through a security edge protection proxy (SEPP) 151 of the VPLMN 102 and a SEPP 153 of the HPLMN 101 to the NRF 107 of the HPLMN 101. After the NRF 107 identifies an appropriate NF that can fulfill the service request within the HPLMN 101, the NRF 107 can send a response containing information about the identified NF. The information contained in the response can be a fully qualified domain name (FQDN) of the NF or a uniform resource identifier (URI). When the NRF 125 of the VPLMN 102 receives the response, it can determine where to route the service request. The NF identified in the HPLMN 101, when receiving the service request, can process the service request and deliver the requested service to the roaming subscriber 139.

The discovery request sent from the NRF 125 in the VPLMN 102 to the NRF 107 in the HPLMN 101 can include a plurality of parameters, such as "target-nf-type", "requester-nf-type", and "services-names", "target-plmn-list", and "requester-plmn-list". The parameter "target-nf-type" can contain the NF type of the target NF to be discovered. The parameter "requester-nf-type" can contain the NF type of the requesting NF that sends the discovery service. The parameter "services-names" can contain an array of services that the requesting NF needs to access. The "target-plmn-list" is included in an inter-PLMN discovery request.

In the HPLMN 101, each NF has a profile registered with the NRF 107. the profile of an NF includes information about the SMF's capabilities and services it provides. The profiles of different NFs may include different information. For example, the profile of the SMF can include network slices supported with specific latency, bandwidth, and QoS characteristics; supported PDU sessions with their respective data rate and allowed QoS flow types; roaming options; supported user data protocols (IPv4 and IPv6) and the QoS classes that can be enforced for different services; and information about the physical location of the SMF (Data Center B, City Y, Country Z).

To enable N9HR roaming as described in this disclosure, the following NFs in the HPLMN 101 may need to be discovered.

The AUSF 113 needs to be discovered for authenticating the subscriber associated with the subscriber 139. The AMF 133 needs to be discovered so that the VPLMN's AMF 133 can communicate with the AMF 119 via the N9 interface to facilitate mobility management procedures and ensure seamless handovers for the roaming subscriber. The SMF

121 needs to be discovered through the N9 interface to handle session management tasks for the roaming subscriber 139. Further, the UPF 146 needs to be discovered so that the VPLMN 102 can interact with the UPF 146 via the N9 interface to forward user data packets between the roaming subscriber 139 and the data network 148. The UDM 111 needs to be discovered so that the VPLMN 102 can interact with the UDM 111 through the N9 interface to access subscriber-related information. The NSSF 105 needs to be discovered so that NFs in the VPLMN 102 can communicate with the NSSF 105 via the N9 interface to ensure that the roaming subscriber 139 is connected to the correct network slice. The PCF 109 needs to be discovered so that NFs in the VPLMN 102 can interact with the PCF 109 via the N9 interface to apply specific policies and ensure consistent service quality for the roaming subscriber 139.

In an embodiment, for the NFs in the HPLMN 101 to be discovered by an inter-PLMN discovery request received from the VPLMN 102, each NF in the HPLMN 101 has to explicitly include, in the profile of the NF, a NF type that matches the NF type specified as the value of the parameter "requester-nf-type" in the discovery request. Otherwise, the discovery request can be rejected by the NRF 107 even if the requested NF is registered with the NRF 107 and the discovery request has all other parameters correctly specified.

Figure 2:
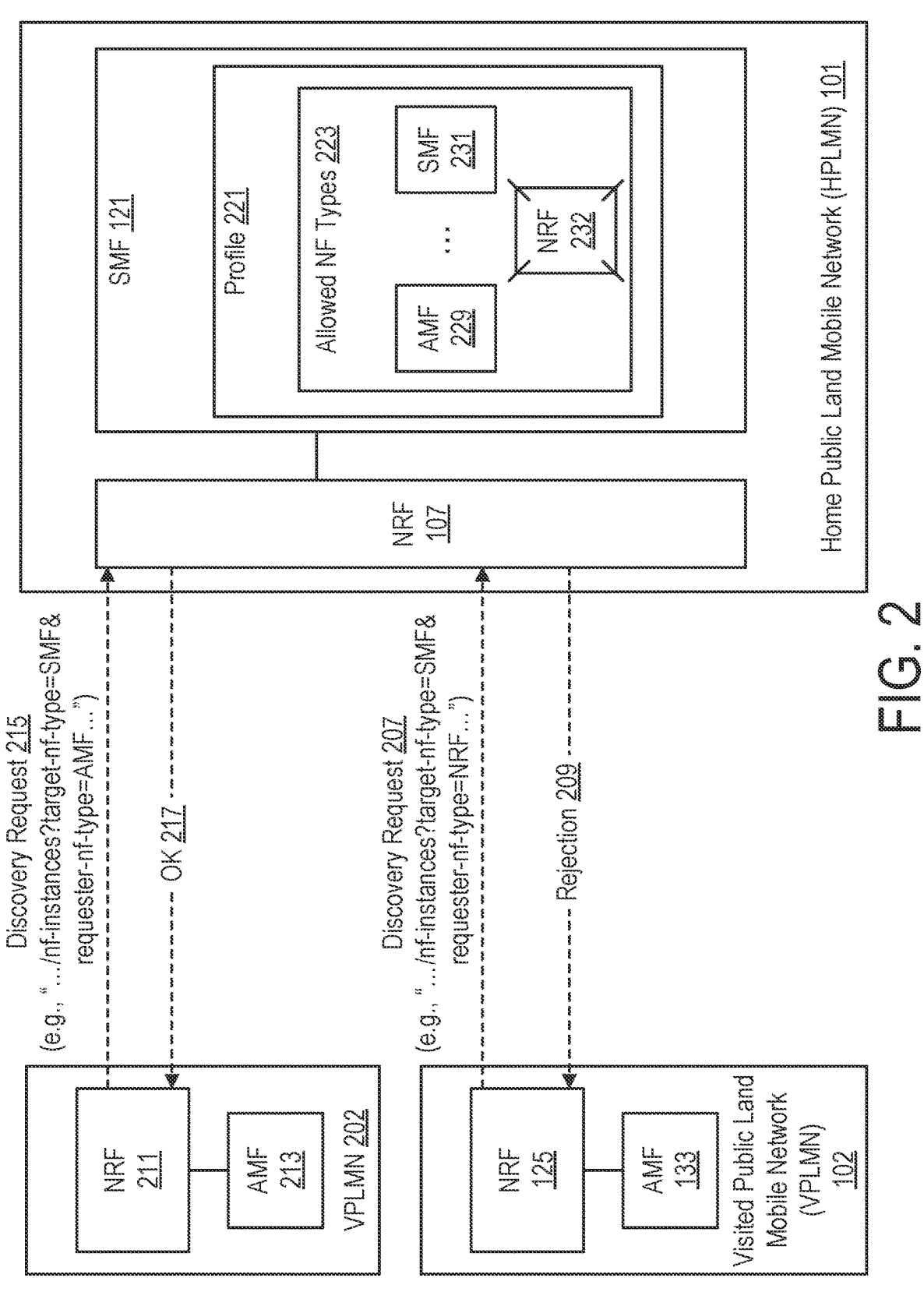
FIG. 2 is a block diagram illustrating two inter-PLMN discovery requests with different responses according to an embodiment of the disclosure.

FIG. 2 is a block diagram illustrating two inter-PLMN discovery requests that are processed differently according to an embodiment of the disclosure. As shown in FIG. 2, the SMF 121 has a profile 221 that specifies a plurality of NFs, e.g., AMF 229 and SMF 231, as allowed NF types 223. However, the specified allowed NF types does not include NRF 232.

The allowed NF types 223 in the profile 221 for the SMF 121 are NF types, each of which can enable an inter-PLMN discovery request to discover the SMF 121 when that allowed NF type is specified as a value of the parameter "requester-nf-type" in the inter-PLMN discovery request. If a particular NF type (e.g., NRF) is not one of the allowed NF types 223 in the profile, when that particular NF type is specified as the value of the parameter "requester-nf-type" in an inter-PLMN discovery request for the SMF 121, the NRF 107 would reject the inter-PLMN discovery request. Since the 3GPP specifications do not require a 5G network to implement inter-PLMN discovery requests in a particular manner, different 5G operators can implement their 5G networks differently with respect to the NF types that can specified as values of the parameter "requester-nf-type" in inter-PLMN discovery requests.

As a result, some 5G operators implement their 5G networks in a manner that requires a type of the NF initiates the inter-PLMN discovery request as the value of the parameter "requester-nf-type", while other 5G operators implement their 5G networks in a manner that require "NRF" as the value of the parameter "requested-nf-type" regardless of which NF initiates the inter-PLMN discovery request. This ambiguity in the 3GPP specifications may lead to problems in interoperability testing (IOT) and/or roaming.

For example, a 5G network VPLMN 202 requires the NF type that initiates the inter-PLMN discovery request to be specified as the value of the parameter "requested-nf-type". Thus, when a subscriber of the HPLMN 101 roaming to the VPLMN 202 makes a call that causes an AMF 213 of the VPLMN 202 to initiate an inter-PLMN discovery request 215 to an NRF 211 of the VPLMN 202 for the SMF 121 of the HPLMN 101, the inter-PLMN discovery request 215 would specify "AMF" the value of the parameter "requesternf-type". Since AMF is in the allowed NF types 223 in the profile 221 of the requested NF (i.e., the SMF 121), the NRF 107 of the HPLMN can grant the discovery request by returning an Ok 217 along with a response including at least the contact information for accessing the requested SMF 121.

As another example, the VPLMN 102 is implemented in a manner that allows "NRF" to be specified as a value of the parameter "requester-nf-type" in an inter-PLMN discovery request 207 for the SMF 121 despite that it is the AMF 133 that initiates the inter-PLMN discovery request 207. In this example, since NRF is not among the allowed NF types 223 in the profile 221 of the requested SMF 121, the NRF 107 would reject the inter-PLMN discovery request 207 by returning a rejection 209 or other information indicating the same.

Figure 3:
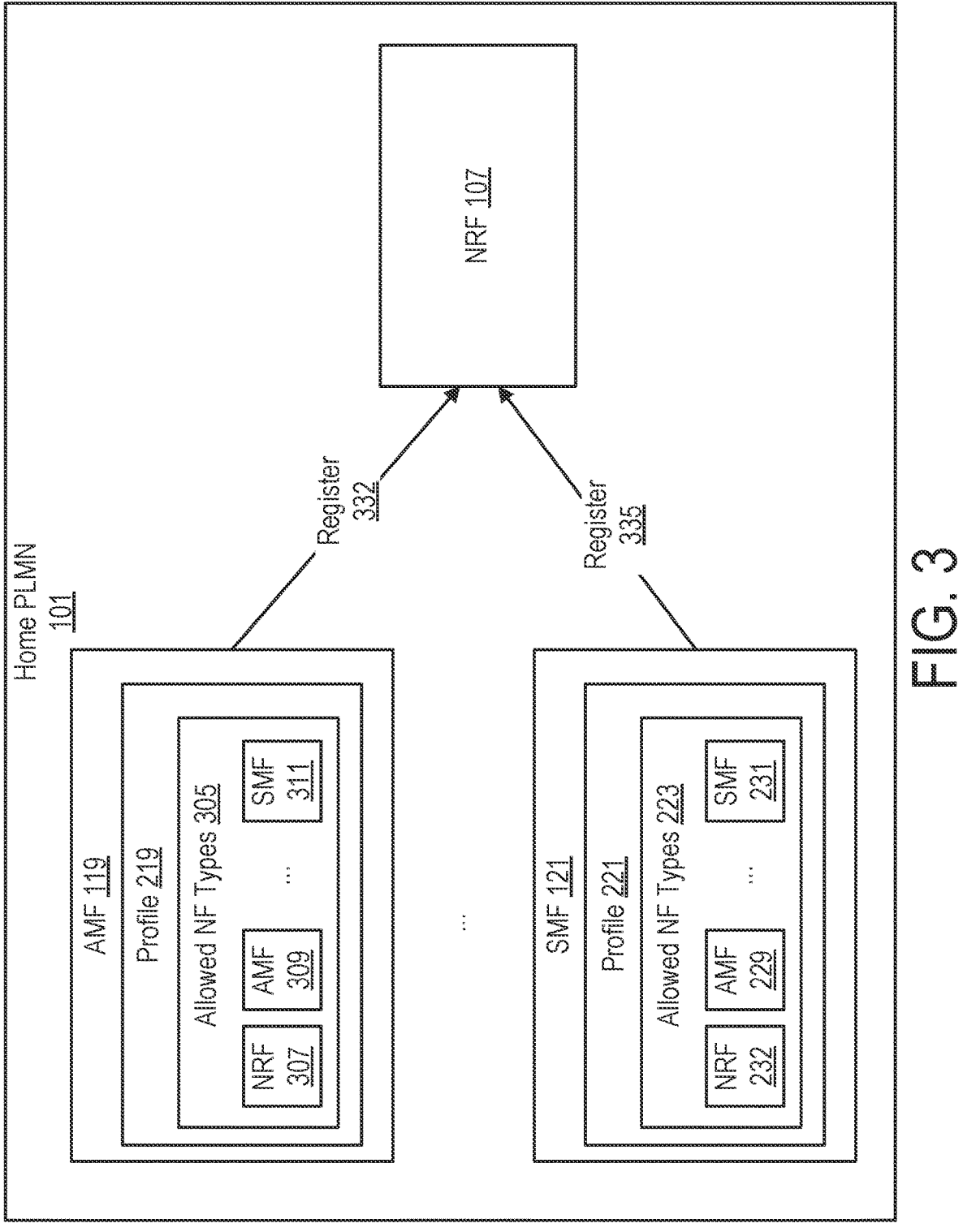
FIG. 3 is a block diagram illustrating the HPLMN with modified NF profiles that are registered with the NRF according to an embodiment of the disclosure.

FIG. 3 is a block diagram illustrating the HPLMN 101 with NF modified profiles that are registered with the NRF 107 according to an embodiment of the disclosure.

In the embodiment, each NF instance in the HPLMN 101 has a modified profile that includes "NRF" as an allowed NF type. FIG. 3 uses the AMF 119 and the SMF 121 as examples and does not show the profiles of the other NFs in the HPLMN 101. However, one of ordinary skill in the art would appreciate that the profile of each other NF in the HPLMN 101 can be similarly modified.

As shown, the AMF 119 includes a profile 219 with allowed NF types 305 including, e.g., "NRF 307", "AMF 309", and "SMF 311"" and the SMF 121 includes a profile 221 with allowed NF types 223 including, e.g., "NRF 232", "AMF 229", and "SMF 231". The profiles 219 and 221 can both be registered represented by lines 332 and 335 with the NRF 107, which can store in a repository the types of NFs available in the HPLMN 101, the services that each available NF provides, and the type of NFs that are allowed to discover/access the available NFs and the services they provide.

Each of the NFs 101-121 and 146 in the HPLMN 101 can be an NF instance registered with the NRF 107 when the NF is instantiated. An IP address of the NRF 107 can be provided to the NF as part of the instantiation process, or the NF can be pre-configured with the FQDN of the NRF 107, such that the NF that has been instantiated has information for access the NRF 107 for registering its profile with NRF 107.

The repository of the NRF 107 ensures that NFs are aware of each other's existence and capabilities, enabling seamless service discovery and interaction within the 5G networks. Accordingly, with the modifications to the profiles as shown above, each of the AMF 119 and the SMF 121 would be discoverable by an inter-PLMN discovery request such as the discovery request 207 shown in FIG. 2.

FIG. 4 illustrates an example of a segment of an NF profile according to an embodiment of the disclosure. The segment focuses on the "allowed NF types" portion of the NF profile, which, in this example, is a profile of a UDM instance in a 5G network.

As shown in the figure, the profile segment specifies "UDM" 403 to indicate that this profile is for an instance of the UDM network function. The profile segment further specifies "NRF", "AMF", "SMF", and "AUSF" as allowed NF types 404. Thus, the UDM instance corresponding to the profile can be discovered by the NF types 404, which includes the NF type of "NRF". Consequently, an inter-PLMN discovery request that specifies "NRF" as the value of the parameter "requester-nf-type" would not be rejected for that reason by the NRF of the HPLMN that receives the discovery request.

As further shown, the profile segment further includes services 405 and 409 and NF types that are allowed to access service. For example, the service "nudm-uyeau" 405 can be accessed by the allowed NF types "NRF" and "AMF" 407, and the service "nudm-uecm" 409 can be accessed by the allowed NF type "AMF" 411. The services that can be accessed by the allowed NF type "AUSF" are not described in the example profile segment for the sake of simplicity.

Figure 5:
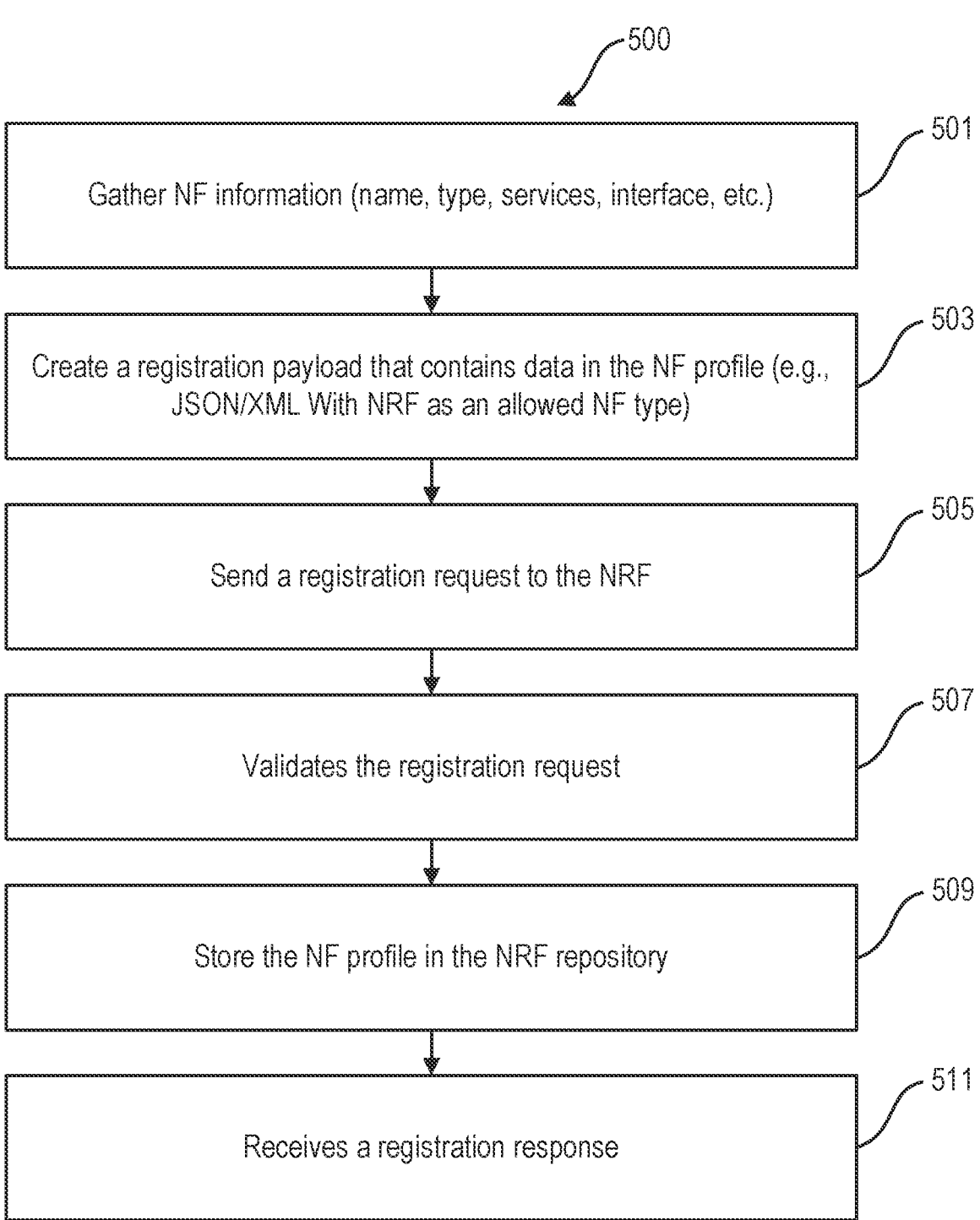
FIG. 5 is a flow diagram of an example process of an NF registering its profile with an NRF of a PLMN according to an embodiment of the disclosure.

FIG. 5 is a flow diagram of an example process 500 of an NF registering its profile with an NRF of a PLMN according to an embodiment of the disclosure. The example process 500 can be performed by a processing logic that can include software, hardware, or a combination thereof. For example, the processing logic can include any NF instance and the NRF 103 described in FIG. 1.

At step 501, the processing logic collects relevant information about the NF instance. This information includes the name, type, supported services, interface details, and other relevant attributes of the NF instance.

At step 503, the processing logic generates a profile for the NF instance. The profile can include the gathered information mentioned above and allowed NF types. In one embodiment, the allowed NF types can be specified by a 5G network administrator through a graphical use interface (GUI) before the generating of the profile, or automatically populated into the profile based on implementation requirements of the 5G core. Regardless of how the allowed NF types are included in the profile, the allowed NF types need to include "NRF". The registering component can then create a registration payload, which could be in the form of JSON, XML, or other appropriate formats containing the NF instance's profile data.

At step 505, the processing logic sends a registration request to the NRF using the appropriate communication channel and protocols. This request contains the NF instance's profile data, which the NF instance wants to make available to other NFs.

At step 507, the processing logic validates the registration request by checking the authorization of the requesting NF instance and ensuring that the NF type is allowed for registration.

At step 509, the processing logic stores the NF instance's profile information in a repository of the NRF and make the NF instance's profile information accessible to other NFs.

At step 511, the processing logic generates a registration response indicating whether the registration was successful or not.

Figure 6:
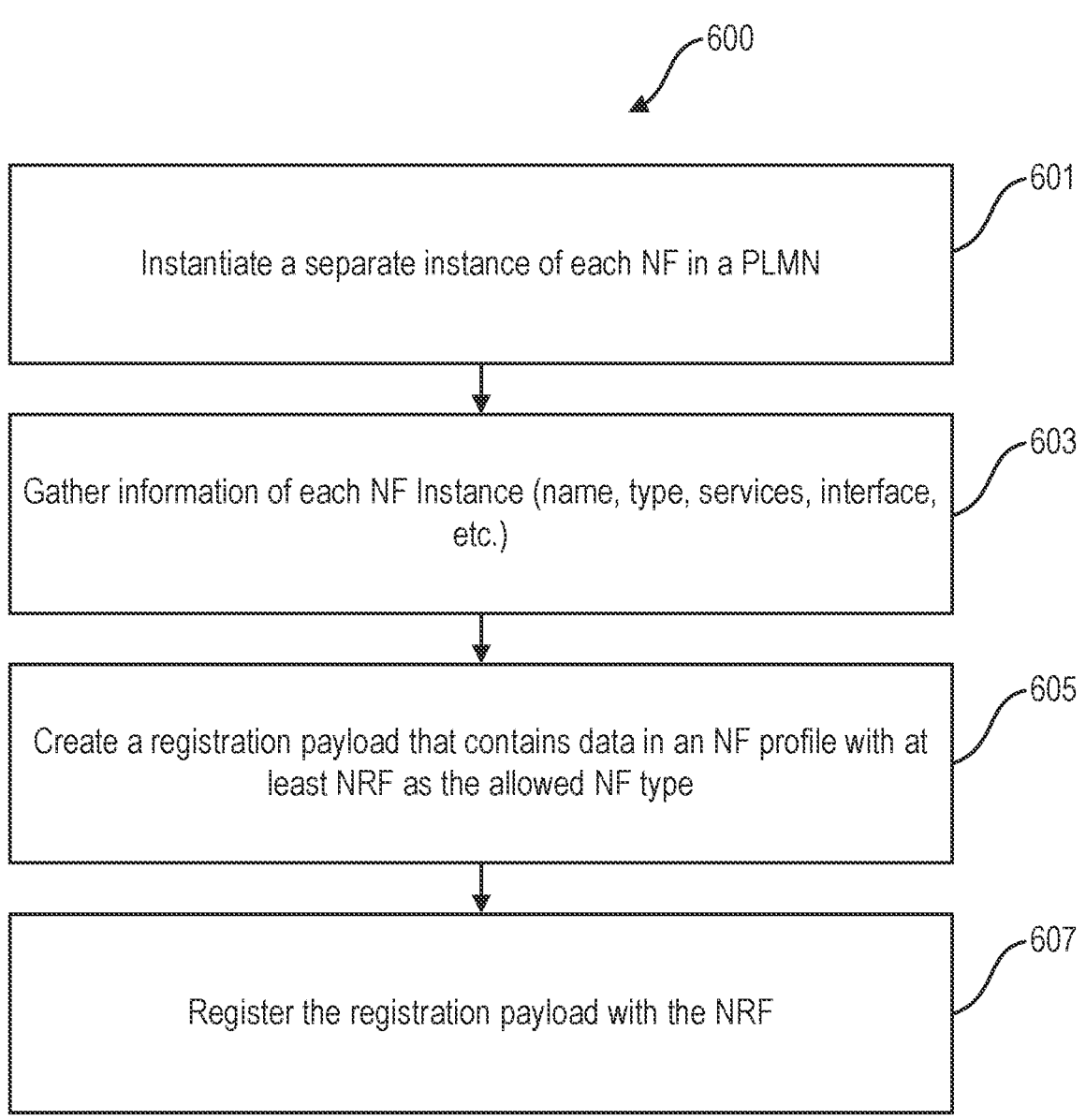
FIG. 6 is a flow diagram illustrating an example process 600 of an NF registering its profile with an NRF of a PLMN according to another embodiment of the disclosure.

FIG. 6 is a flow diagram illustrating an example process 600 of an NF registering its profile with an NRF of a PLMN according to an embodiment of the disclosure. The example process 600 can be performed by a processing logic that can include software, hardware, or a combination thereof. For example, the processing logic can include one or more of any NF instance, the NRF 107 described in FIG. 1, and one or more other components in the HPLMN 101.

In this embodiment, profiles of existing NF instances are not changed or updated. Instead, a separate instance of each NF in the PLMN can be created, and the separately created NF instance's profile can include at least NRF as an allowed NF type. More details of the process 100 are provided below. In other embodiments, however, the profiles of existing NF instances can be updated to include NRF as an allowed NF type such that the existing NF instances can be discovered by consumer NF instances that send discovery requests specifying NRF as the requester NF type.

At step 601, the processing logic instantiates an instance of each NF (e.g., NFs 105-121 and 146 in FIG. 1) in the PLMN. The NF instance can be created solely for accepting inter-PLMN discovery requests with NRF as a value of the parameter "requester-nf-type".

At step 603, the processing logic gathers information about the NF instance. The information can include the name, type, supported services, interface details, and other relevant attributes of the NF instance.

At step 605, the processing logic generates a profile for the NF instance. The profile can include at least NRF as an allowed NF type and also include the gathered information mentioned above.

At step 607, the processing logic sends a registration request to the NRF using the appropriate communication channel and protocols. This request contains the NF instance's profile data.

FIG. 7 is a flow diagram illustrating an example process 700 of enabling N9HR roaming in 5G networks according to an embodiment of the disclosure. The example process 700 can be performed by a processing logic that can include software, hardware, or a combination thereof. For example, the processing logic can include the NRF 107 described in the HPLMN 101.

At step 701, the processing logic receives, from a second PLMN, a discovery request for a NF in the first PLMN, wherein the discovery request specifies NRF as the requester NF type.

At step 703, the processing logic determines that a registered profile of the requested NF includes NR" as an allowed NF type.

At step 705, the processing logic sends a response with contact information of the requested NF to the second PLMN in response to determining that the registered profile of the requested NF includes NRF as an allowed NF type. The contact information can be a universal resource identifier (URI) of the requested NF.

Figure 8:
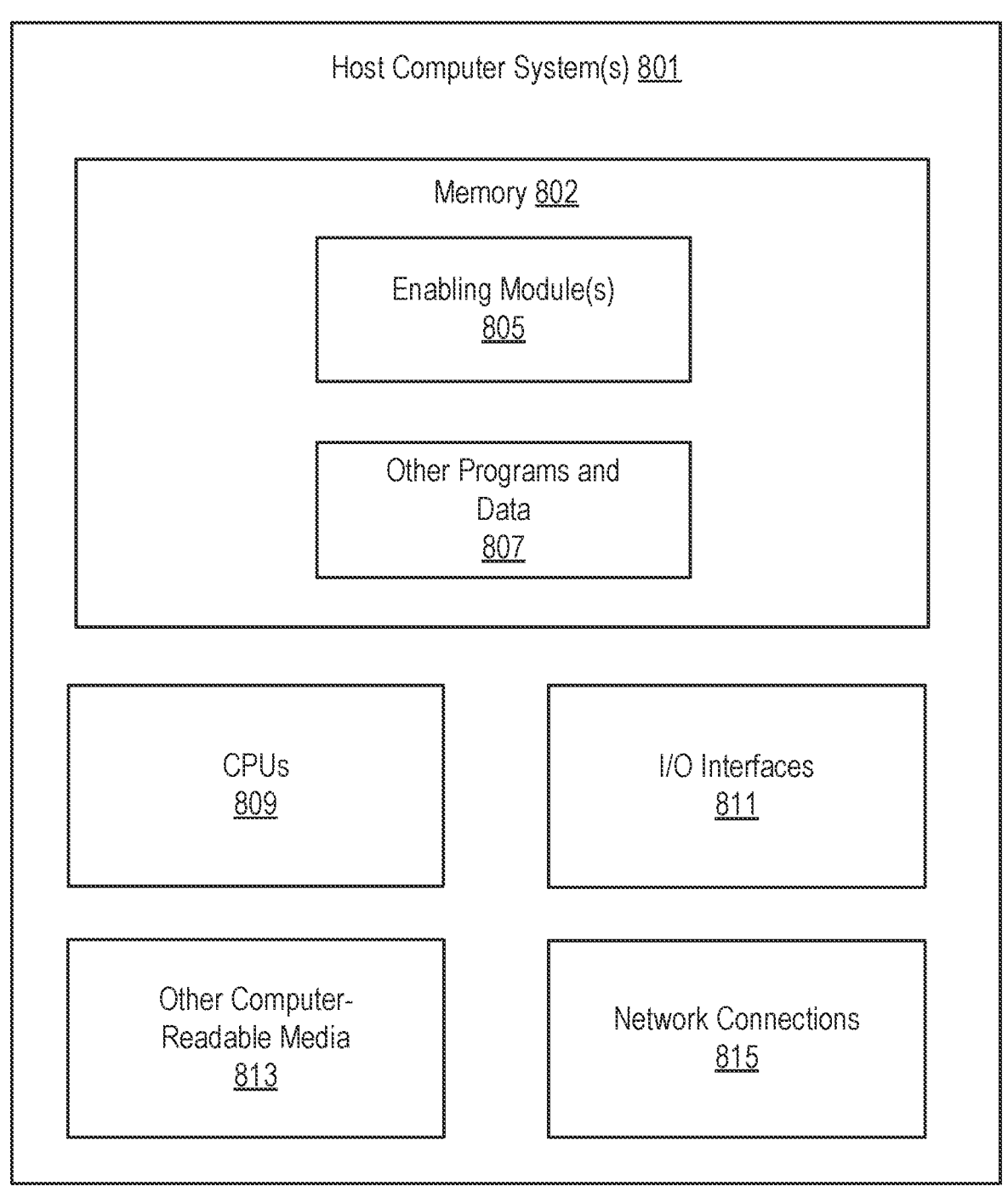
FIG. 8 shows a system diagram that describes an example implementation of a computing system(s) for implementing embodiments described herein.

FIG. 8 shows a system diagram that describes an example implementation of a computing system(s) for implementing embodiments described herein.

The functionality described herein for removing requester NF type ambiguity to enable N9HR roaming in 5G networks can be implemented either on dedicated hardware, as a software instance running on dedicated hardware, or as a virtualized function instantiated on an appropriate platform, e.g., a cloud infrastructure. In some embodiments, such functionality can be completely software-based and designed as cloud-native, meaning that they are agnostic to the underlying cloud infrastructure, allowing higher deployment agility and flexibility. However, FIG. 8 illustrates an example of underlying hardware on which such software and functionality can be hosted and/or implemented.

In this embodiment, an example host computer system(s) 801 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable, for removing requester NF type ambiguity to enable N9HR 5G roaming in 5G networks. In some embodiments, one or more special-purpose computing systems can be used to implement the functionality described herein. Accordingly, various embodiments described herein can be implemented in software, hardware, firmware, or in some combination thereof. Host computer system(s) 801 can include memory 802, one or more central processing units (CPUs) 809, I/O interfaces 811, other computer-readable media 813, and network connections 815.

Memory 802 can include one or more various types of non-volatile (non-transitory) and/or volatile (transitory) storage technologies. Examples of memory 802 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 802 can be utilized to store information, including computer-readable instructions that are utilized by CPU 809 to perform actions, including those of embodiments described herein.

Memory 802 can have stored thereon enabling module(s) 805 that can be configured to implement and/or perform some or all of the functions of the systems, components and modules described herein for enabling N9HR 5G roaming in 5G networks. Memory 802 can also store other programs and data 807, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 815 are configured to communicate with other computing devices to facilitate the functionality described herein. In various embodiments, the network connections 815 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 811 can include video interfaces, other data input or output interfaces, or the like. Other computer-readable media 813 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A system for enabling N9 home routing (N9HR) roaming in mobile networks, comprising:
   a memory that stores computer-executable instructions; and
   at least one processor that executes the computer-executable instructions to cause a network repository function (NRF) of a first public land mobile network (PLMN) to perform operations, the operations comprising:

receiving, from a second PLMN, a discovery request for a network function (NF) in the first PLMN, wherein the discovery request specifies NRF as a requester NF type;
   determining that a registered profile of the requested NF includes NRF as an allowed NF type; and
   in response to determining that the registered profile of the requested NF includes NRF as an allowed NF type, sending a response with contact information of the requested NF to the second PLMN, wherein the registered profile of the requested NF additionally includes one or more NF types as allowed NF types, wherein each allowed NF type in the registered profile enables the requested NF to be discovered by discovery requests that specify that allowed NF type as the requester NF type in the discovery requests.

2. The system of claim 1, wherein the operations further comprise:
   receiving a service request for the requested NF from the second PLMN.

3. The system of claim 1, wherein the first PLMN is a home PLMN of a subscriber that initiates the discovery request, and the second PLMN is a visited PLMN that the subscriber roams to and that is different from the first PLMN, wherein each of the first PLMN and the second PLMN is a fifth generation (5G) network.

4. The system of claim 3, wherein the subscriber is a terminal device.

5. The system of claim 1, wherein the requested NF is one of an access and mobility management function (AMF), a session management function (SMF), a user plane function (UPF), a unified data management (UDM), an authentication server function (AUSF), a policy control function (PCP), and a network slice selection function (NSSF).

6. The system of claim 1, wherein the first PLMN and the second PLMN communicate with each other through their respective network repository functions (NRFs).

7. A method of enabling N9 home routing (N9HR) roaming in 5$^{th}$ generation (5G) mobile networks, comprising:
   receiving, at a network repository function (NRF) of a first public land mobile network (PLMN) from a second PLMN, a discovery request for a network function (NF) in the first PLMN, wherein the discovery request specifies NRF as a requester NF type;
   determining, by the NRF of the first PLMN, that a registered profile of the requested NF includes NRF as an allowed NF type; and
   in response to determining that the registered profile of the requested NF includes NRF as an allowed NF type, sending, by the NRF of the first PLMN, a response with contact information of the requested NF to the second PLMN, wherein the registered profile of the requested NF additionally includes one or more NF types as allowed NF types, wherein each allowed NF type in the registered profile enables the requested NF to be discovered by discovery requests that specify that allowed NF type as the requester NF type in the discovery requests.

8. The method of claim 7, further comprising:
   receiving a service request for the requested NF from the second PLMN.

9. The method of claim 7, wherein the first PLMN is a home PLMN of a subscriber that initiates the discovery request, and the second PLMN is a visited PLMN that the subscriber roams to and that is different from the first PLMN, wherein each of the first PLMN and the second PLMN is a fifth generation (5G) network.

10. The method of claim 9, wherein the subscriber is a terminal device.

11. The method of claim 7, wherein the requested NF is one of an access and mobility management function (AMF), a session management function (SMF), a user plane function (UPF), a unified data management (UDM), an authentication server function (AUSF), a policy control function (PCP), and a network slice selection function (NSSF).

12. The method of claim 7, wherein the first PLMN and the second PLMN communicate with each other through their respective network repository functions (NRFs).

13. A non-transitory computer-readable storage medium having computer-executable instructions stored thereon which, when executed by at least one processor of a first public land mobile network (PLMN), cause a network repository function (NRF) of the first PLMN to perform operations of enabling N9 home routing (N9HR) roaming in $5^{th}$ generation (5G) mobile networks, the operations comprising:

receiving, from a second PLMN, a discovery request for a network function (NF) in the first PLMN, wherein the discovery request specifies NRF as a requester NF type;

determining that a registered profile of the requested NF includes NRF as an allowed NF type; and in response to determining that the registered profile of the requested NF includes NRF as an allowed NF type, sending a response with contact information of the requested NF to the second PLMN, wherein the registered profile of the requested NF additionally includes one or more NF types as allowed NF types, wherein each allowed NF type in the registered profile enables the requested NF to be discovered by discovery requests that specify that allowed NF type as the requester NF type in the discovery requests.

14. The non-transitory computer-readable storage medium of claim 13, wherein the operations further comprise:

receiving a service request for the requested NF from the second PLMN.

15. The non-transitory computer-readable storage medium of claim 13, wherein the first PLMN is a home PLMN of a subscriber that initiates the discovery request, and the second PLMN is a visited PLMN that the subscriber roams to and that is different from the first PLMN, wherein each of the first PLMN and the second PLMN is a fifth generation (5G) network.

16. The non-transitory computer-readable storage medium of claim 15, wherein the subscriber is a terminal device.

17. The non-transitory computer-readable storage medium of claim 13, wherein the requested NF is one of an access and mobility management function (AMF), a session management function (SMF), a user plane function (UPF), a unified data management (UDM), an authentication server function (AUSF), a policy control function (PCP), and a network slice selection function (NSSF).

\* \* \* \* \*